United States Patent Office 2,970,151
Patented Jan. 31, 1961

2,970,151
BENZYLIDENE BISCRESOLS

David J. Beaver, Richmond Heights, Mo., and Richard O. Zerbe, Nitro, W. Va., assignors to Monsanto Chemical Company, St. Louis, Mo., a corporation of Delaware No Drawing. Original application Oct. 26, 1951, Ser. No. 253,474. Divided and this application June 18, 1957, Ser. No. 666,465

5 Claims. (Cl. 260—395)

This invention relates to a new and novel family of dihydroxy diaryl methanes. More particularly it relates to dihydroxy diaryl methanes derived by condensing aldehydes with di-substituted phenols containing a halogen or polycarbon alkyl group in the 2-position and an alkyl group in either the 5- or 6-position and to their method of manufacture. Especially valuable and therefore preferred are derivatives of 2,5-dialkyl phenols.

With reference to derivatives of 2,5-dialkyl phenols it has been found that dihydroxy diaryl methanes of the probable general formula

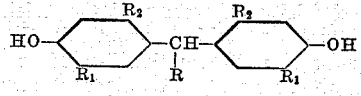

where

is a radical derived from an aldehyde reactant, as for example formaldehyde, pyruvic aldehyde, butyraldehyde, α-ethyl-β-methyl acrolein, benzaldehyde, and the like, where $R_1$ is an alkyl group containing at least four carbon atoms and where $R_2$ is an alkyl group, preferably a short chain alkyl group, can be readily formed by condensing the appropriate 2,5-dialkyl phenol and an aldehyde and comprise a new family of highly useful antioxidants.

Dialkyl phenols suitable as starting materials for the preparation of the new compounds may be prepared by a variety of methods, however the position of the alkyl groups exerts a profound influence on the antioxidant properties and it is essential to employ phenols having the proper orientation of the alkyl groups. Exemplary of one suitable class of dialkyl phenols are the products prepared by alkylating a meta or 3-alkyl substituted phenol with a tertiary alcohol or olefin in the presence of sulfuric acid or phosphoric acid catalyst. This affords a convenient direct synthesis and the published evidence indicates that under these conditions the alkyl group enters the 6-position. In any event this class of products have proven to be satisfactory. Other methods of synthesis are equally well known and available for the introduction of normal alkyl groups. Examples of suitable dialkyl phenols together with their physical properties are listed below:

6-tert. butyl m-cresol, B.P. 130° C./20 mm.
2-tert. butyl 5-ethyl phenol, B.P. 135–138° C./20 mm.
6-tert. amyl m-cresol, B.P. 133–137° C./20 mm.
6-n-butyl m-cresol, B.P. 134° C./15 mm.
2-n-butyl 5-ethyl phenol, B.P. 119–121° C./4 mm.
6-isoamyl m-cresol, B.P. 104–106° C./2 mm.
6-n-hexyl m-cresol, B.P. 118–119° C./2.5 mm.
6-isohexyl m-cresol, B.P. 108–109° C./1.5 mm.
6-n-heptyl m-cresol, B.P. 126–128° C./2.5 mm.
6-n-octyl m-cresol, B.P. 141–143° C./3 mm.
6-n-decyl m-cresol, B.P. 146–147° C./2 mm.
6-n-dodecyl m-cresol, B.P. 183° C./3 mm. (M.P. 44° C.).

Still further examples of suitable 2,5-dialkyl phenols are 6-sec. butyl m-cresol, 6-(2,4-dimethyl butyl) m-cresol, 6-sec. amyl m-cresol, 6-sec. octyl m-cresol and 2,5-di-tert. butyl phenol.

Among the aldehydes which may be employed are formaldehyde, paraformaldehyde, acetaldehyde, paraldehyde, propionaldehyde, n-butyraldehyde, iso butyraldehyde, aldol, n-valeraldehyde, n-heptaldehyde, crotonaldehyde, β-ethyl-α-methyl acrolein, α-ethyl-β-propyl acrolein, pyruvic aldehyde, α-furfuraldehyde, benzaldehyde, p-hydroxy benzaldehyde, cinnamaldehyde, and the like.

Of particular importance are dihydroxy diaryl methanes of the probable general formula

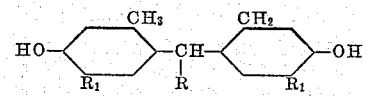

where R is an alkyl hydrocarbon group and $R_1$ is an alkyl group of at least four carbon atoms. Such compounds may be economically prepared and in general are characterized both by exceptional antioxidant properties and freedom from discoloration. They may therefore be employed in the manufacture of light colored rubber articles. Formaldehyde derivatives are efficient but less easily prepared. Derivatives of aromatic aldehydes are also antioxidants but less efficient. Similarly compounds derived from substituted aldehydes, whether aliphatic or aromatic, have in general proved to be less efficient antioxidants than those derived from the corresponding unsubstituted aldehydes. On the other hand the new compounds also comprise antiseptic and germicidal agents and for this purpose the most effective compounds have been obtained from substituted aldehydes. For example, 4,4'-(p-hydroxy benzylidene)-bis-(3-methyl-6-tert. butyl phenol) exhibits excellent antiseptic properties which properties are retained in the presence of soap. This subject matter is claimed in an application filed by one of us and others January 5, 1951, Serial No. 204,698, now U.S. Patent 2,678,302.

The condensation of the phenol and the aldehyde is usually carried out in a molar proportion of 2:1 in the presence of an acidic condensation catalyst, as for example, hydrochloric acid. Where desired solvents and/or dispersing mediums may be employed although the reactions are actually carried out in the absence of either. The following examples are illustrative of the preparation of the new compounds.

Example 1

To a suitable container was added 98.4 grams (substantially 0.6 mole) of 6-tert. butyl m-cresol, B.P. 130° C./20 mm., 24.0 grams (substantially 0.33 mole) of butyraldehyde and 6 grams of concentrated hydrochloric acid. The mixture was refluxed for about 8 hours at 100–105° C. whereupon a mushy solid developed. The latter was steam distilled free of volatile matter. Thereupon the residue was taken up with benzene and washed free of acid with water, whereupon the water-benzene mix was distilled off and the mass evaporated to dryness. The white solid so obtained was recrystallized and gave a fine white crystalline product possessing a melting point of 210.2–210.9° C. (corr.) which was believed to be 4,4'-butylidene bis-(6-tert. butyl m-cresol). Analysis for carbon and hydrogen gave 81.91% and 10.23% respectively as compared to calculated values of 81.64% and 10.01%.

Example 2

To a suitable container was added 82.1 grams (substantially 0.5 mole) of 6-tert. butyl m-cresol as described in the foregoing example, 18.0 grams (substantially 0.25 mole) of isobutyraldehyde, and 4.7 grams of concentrated hydrochloric acid. The mixture was refluxed at 95° C. for approximately one-half hour. The reaction mixture was cooled and thereto was added 100 ml. of a liquid aliphatic hydrocarbon consisting chiefly of heptanes. The mix was agitated for 4 hours at 30–32° C. and the white solid was filtered off, washed with several portions of the aforesaid aliphatic hydrocarbon and subsequently dried. Upon recrystallization from benzene a white crystalline product was obtained which possessed a melting point of 228.9–229.7° C. (corr.) and was believed to be 4,4'-isobutylidene bis (6-tert. butyl m-cresol). Further purification by recrystallization from heptane gave a product M.P. 229.8–230.7° C. Analysis for carbon and hydrogen gave 81.47% and 9.94% respectively as compared to calculated values of 81.64% and 10.01%.

The following crystalline compounds were prepared employing essentially the procedure of Example 2 by refluxing a half gram mole of the appropriate phenol and one-fourth gram mole of the aldehyde in the presence of hydrochloric acid catalyst. The reaction times varied, these being determined by spot testing at intervals with a suitable solvent or precipitant for crystal formation and quenching the reaction when crystal formation was observed and before sufficient resin was formed to interfere with the purification of the crystals. A heptane fraction as described in the detailed example was used except that No. 2 was precipitated by caustic soda from glacial acetic acid.

No. 1. 4,4'-benzylidene bis-(6-tert. butyl m-cresol), M.P. 199.3–199.8° C. (corr.), pearly solid, from benzaldehyde and 6-tert. butyl m-cresol, reaction time ½ hour. Carbon found 83.54%, calc. 83.62%. Hydrogen found 8.55%, calc. 8.71%.

No. 2. 4,4'-(p-hydroxy benzylidene)-bis-(6-tert. butyl m-cresol), M.P. 262.4–263.1° C. (corr.), lemon yellow solid, from p-hydroxy benzaldehyde and 6-tert. butyl m-cresol, reaction time ½ hour. Carbon found 80.33%, calc. 80.53%. Hydrogen found 8.10%, calc. 8.39%.

No. 3. 4,4'-(o-hydroxy benzylidene)-bis-(6-tert. butyl m-cresol), white solid from toluene M.P. 216.7–217° C., reaction time ½ hour. Carbon found 80.37%, calc. 80.53%. Hydrogen found 8.59%, calc. 8.39%. This product was prepared from salicylaldehyde and 6-tert. butyl m-cresol.

No. 4. 4,4'-(3,4-dimethoxybenzylidene)-bis-(6-tert. butyl m-cresol), white solid from heptane M.P. 231.2–231.9° C., from veratraldehyde and 6-tert. butyl m-cresol, reaction time ½ hour. Carbon found 78.17%, calc. 78.12%. Hydrogen found 8.60%, calc. 8.46%.

As illustrative of the antioxidant properties of the new dihydroxy diaryl methanes several rubber base stocks were compounded comprising

| | Parts by weight |
|---|---|
| Pale crepe rubber | 100.0 |
| Zinc oxide | 60.0 |
| Lithopone | 20.0 |
| Sulfur | 2.0 |
| Diphenyl guanidine phthalate | 0.825 |
| Benzothiazyl thiobenzoate | 0.675 |
| Paraffin | 0.25 |

To each base stock was added 1.0 part by weight of one of the antioxidants listed below. The respective stocks were cured in the usual manner by heating in a press at 126° C. for 45 and 60 minutes. The first column of data in the following table shows the percent retention of ultimate tensile strength obtained after aging for 12 hours in an air bomb at 121° C. at 80 lbs./in.$^2$. The figures are the averages for the two cures. The second column shows the resistance to discoloration. Samples of the cured stocks were exposed under an S–1 sunlamp for 10 days. After exposure the light reflected from the surface of the stocks was measured by means of a Photovolt Reflectance Meter calibrated against reflectance of standard MgO as 100%. The data shown are percent reflectance of the 60 minute cures.

TABLE I

| Antioxidant | Tensile Retained, percent | Light Reflectance, percent |
|---|---|---|
| None | 35 (ave.) | 73 (ave.) |
| 4,4'-Butylidene bis-(6-tert. butyl m-cresol) | 67 | 72 |
| 4,4'-Benzylidene bis-(6-tert. butyl m-cresol) | 68 | 60 |
| 4,4'-Isobutylidene bis-(6-tert. butyl m-cresol) | 59 | 71 |

Further examples of the new compounds were prepared from chloro-substituted benzaldehydes. Approximately 4 ml. of concentrated hydrochloric acid was added to a well-stirred solution of 0.5 gram moles of 6-tert. butyl m-cresol and 0.25 gram moles of the aldehyde. The reaction mixture was held at about 95° C. and tested periodically for crystal formation by adding one ml. of the reaction mixture to 3 ml. of heptane and when crystal formation was noted the reaction mixture was quenched by adding 100 ml. of heptane and the mixture cooled. The crystalline product was filtered, washed with cold heptane and recrystallized from the same solvent. They possess antiseptic and germicidal properties.

TABLE II

| Aldehyde | Time, Hrs. | M.P., °C | Empirical Formula | | Calc., percent | Found, percent |
|---|---|---|---|---|---|---|
| 2,4-Dichlorobenzaldehyde | 4 | 209.9–210.4 | $C_{29}H_{34}Cl_2O_2$ | Carbon | 71.73 | 71.91 |
| | | | | Hydrogen | 7.06 | 6.96 |
| | | | | Chlorine | 14.61 | 14.65 |
| 5-Chlorosalicylaldehyde | 6 | 214.2–215.9 | $C_{29}H_{35}ClO_3$ | Carbon | 74.58 | 74.86 |
| | | | | Hydrogen | 7.55 | 7.49 |
| | | | | Chlorine | 7.59 | 7.58 |
| o-Chlorobenzaldehyde | ½ | 226.3–226.9 | $C_{29}H_{35}ClO_2$ | Carbon | 77.22 | 77.20 |
| | | | | Hydrogen | 7.82 | 7.76 |
| | | | | Chlorine | 7.86 | 8.02 |

This application is a division of co-pending application Serial No. 253,474, filed October 26, 1951, which latter is a continuation-in-part of application Serial No. 159,128, filed April 29, 1950, now abandoned.

What is claimed is:

1. As a composition of matter a compound of the structure

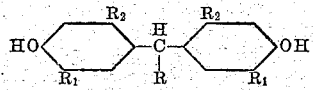

where R is an aromatic radical of the benzene series, $R_1$ is an alkyl group containing at least 4 but not more than 12 carbon atoms and $R_2$ is an alkyl group containing less than 3 carbon atoms.

2. As a composition of matter a compound of the structure

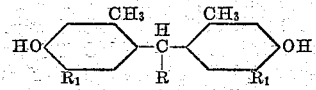

where R is an aromatic radical of the benzene series and $R_1$ is a branched chain alkyl group containing at least 4 but less than 9 carbon atoms.

3. As a composition of matter a compound of the structure
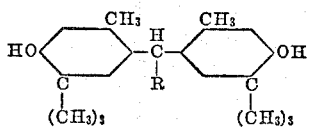
where R is an aromatic radical of the benzene series.
4. As a composition of matter a compound of the structure
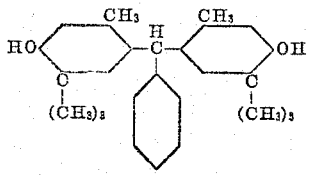
5. As a composition of matter a compound of the structure
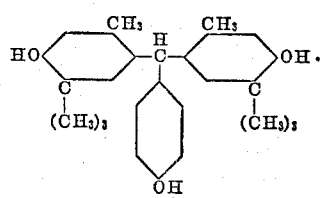
References Cited in the file of this patent
UNITED STATES PATENTS
| | | |
|---|---|---|
| 2,515,907 | Stevens et al. | July 18, 1950 |
| 2,559,932 | Briggs et al. | July 10, 1951 |
| 2,570,402 | Stevens et al. | Oct. 9, 1951 |
| 2,734,088 | Knowles et al. | Feb. 7, 1956 |